United States Patent
Chinn et al.

(10) Patent No.: US 10,965,732 B2
(45) Date of Patent: *Mar. 30, 2021

(54) STREAMING ZIP

(71) Applicant: Apple Inc., Cupertino, CA (US)

(72) Inventors: Paul William Chinn, San Jose, CA (US); Eric Olaf Carlson, Mountain View, CA (US); Ronnie Misra, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/287,798

(22) Filed: Feb. 27, 2019

(65) Prior Publication Data
US 2019/0199775 A1 Jun. 27, 2019

Related U.S. Application Data

(60) Continuation of application No. 15/236,268, filed on Aug. 12, 2016, now Pat. No. 10,250,670, which is a division of application No. 13/744,007, filed on Jan. 17, 2013, now Pat. No. 9,420,070.

(51) Int. Cl.
*H04L 29/08* (2006.01)
*H04L 29/06* (2006.01)

(52) U.S. Cl.
CPC .......... *H04L 67/06* (2013.01); *H04L 29/0651* (2013.01); *H04L 29/08117* (2013.01); *H04L 29/08612* (2013.01); *H04L 65/607* (2013.01); *H04L 67/145* (2013.01); *H04L 69/04* (2013.01)

(58) Field of Classification Search
CPC ......... H04L 29/08576; H04L 29/08594; H04L 29/08612; H04L 65/607–608; H04L 67/06; H04L 67/142; H04L 67/145; H04L 69/04
See application file for complete search history.

(56) References Cited

U.S. PATENT DOCUMENTS

| | | | |
|---|---|---|---|
| 6,377,974 B1* | 4/2002 | Feigenbaum | H04L 29/06 709/203 |
| 6,401,239 B1* | 6/2002 | Miron | H04L 63/0807 717/173 |
| 7,039,663 B1* | 5/2006 | Federwisch | G06F 11/1451 |
| 7,624,132 B2 | 11/2009 | Lovvik et al. | |
| 8,024,382 B2 | 9/2011 | Evans et al. | |

(Continued)

OTHER PUBLICATIONS

Plotz, Henryk, "Self-Replication in J2ME MI Diets", System Architecture Group, Computer Science Department, Humboldt-University, Berlin, Germany, May 15, 2006, 13 pages.

(Continued)

*Primary Examiner* — Brendan Y Higa
(74) *Attorney, Agent, or Firm* — Dickinson Wright RLLP

(57) ABSTRACT

A system is described to create and transmit a streamable ZIP file container. The streamable ZIP file container contains stream metadata, files, and a central directory. The stream metadata, files, and central directory can be saved in a contiguous stream without any intervening bytes. When the streamable ZIP file container is read by a client device that supports streamable ZIP file containers, the client device can exit the data stream without receiving the central directory. Interruptions during transmission of the ZIP file container can be resumed.

20 Claims, 8 Drawing Sheets

(56) References Cited

U.S. PATENT DOCUMENTS

| | | | |
|---|---|---|---|
| 8,630,899 B1 | 1/2014 | Barbulescu et al. | |
| 9,420,070 B2 | 8/2016 | Chinn et al. | |
| 10,250,670 B2 | 4/2019 | Chinn et al. | |
| 2001/0002900 A1 | 6/2001 | Romrell | |
| 2002/0042833 A1 | 4/2002 | Hendler et al. | |
| 2002/0099798 A1* | 7/2002 | Fedorovsky | G06F 16/9535 709/219 |
| 2003/0140065 A1 | 7/2003 | Lovvik et al. | |
| 2004/0117459 A1* | 6/2004 | Fry | H04W 88/184 709/219 |
| 2005/0102561 A1* | 5/2005 | Graham | H04L 69/40 714/15 |
| 2006/0184587 A1 | 8/2006 | Federwisch et al. | |
| 2007/0299930 A1* | 12/2007 | Wendelrup | H04L 67/06 709/217 |
| 2008/0141373 A1 | 6/2008 | Fossen et al. | |
| 2009/0037550 A1 | 2/2009 | Mishra et al. | |
| 2009/0204719 A1 | 8/2009 | Simongini et al. | |
| 2010/0185690 A1 | 7/2010 | Evans et al. | |
| 2012/0191802 A1* | 7/2012 | Rodrigues | H04L 67/06 709/217 |
| 2013/0346379 A1 | 12/2013 | Loe et al. | |
| 2015/0066858 A1 | 3/2015 | Sabdar et al. | |

OTHER PUBLICATIONS

PKWARE, Inc., "SecureZIP for iSeries", Users Guide, www.pkware. com, 8.1 Edition, Version 8, Release 1, 2005, Miamisburg, Ohio, 408 pages.

Rellermeyer, Jans. et al., "Concierge: A Service Platform for Resource—Constrained Devices", Department of Computer Science, ETH Zurich, EuroSys 07, Mar. 21-23, 2007, Lisboa, Portugal, Copyright 2007, ACM 978-1-59593-636-3/07/0003, Mar. 21, 2007, pp. 245-258.

PCT Patent Application No. PCT /US2014/012114—International Search Report and Written Opinion dated Jul. 1, 2014.

Taiwanese Patent Application No. 103101866—Office Action dated Oct. 7, 2015.

* cited by examiner

STREAMING ZIP

CROSS-REFERENCE TO RELATED APPLICATION

This Application is a continuation of U.S. patent application Ser. No. 15/236,268, entitled "STREAMING ZIP," filed Aug. 12, 2016, which is a divisional of U.S. patent application Ser. No. 13/744,007, entitled "STREAMING ZIP," filed Jan. 17, 2013, issued as U.S. Pat. No. 9,420,070 on Aug. 16, 2016, the contents of which are incorporated by reference herein in their entirety for all purposes.

TECHNICAL FIELD

The present technology pertains to file containers, and more specifically pertains to the creation and transmission of streamable ZIP file containers.

BACKGROUND

As Internet access becomes more popular, software products and media are more frequently being transferred and sold via the Internet instead of through physical media such as CDs and DVDs. Often times, a sender (or seller) can transfer files to a recipient (or buyer) through one or more networks. The files are grouped and compressed into a single package called a file container (or archive file) for ease of use. One popular archive file format is the PKZIP file format developed by PKWARE. This file format is informally known as "zip archives" or "zip files". A ZIP archive is made up of a set of files and a central directory. The central directory includes many records that each store file attributes essential to the operation of the ZIP archive. Each record can identify the location of a file in the ZIP archive along with attributes on the compression or encryption algorithm applied to the file, if any. In practice, bytes of undefined data are disbursed throughout the ZIP archive and as a result the central directory serves as a map to locate and order the plurality of files. The central directory can also include information to verify the integrity of the content in the ZIP archive. For these reasons, ZIP archives need to be received in their entirety before the data stored in the ZIP archive can be decompressed and accessed.

Using a ZIP file container can have certain drawbacks. For example, network resources can be wasted if an interrupt is received during transmission of a ZIP file container. The interruption can be due to a power outage or a network failure. Since the architecture of the ZIP file container requires that the container be received in its entirety before the data within the container is accessible, the received portion of the ZIP file container can be unusable depending on the file format. In some situations, the ZIP file container must be retransmitted to the user thus resulting in wasted bandwidth. As another example, the processing time of a ZIP file container can be overly long since the entire ZIP file container must be downloaded before the data stored in the container can be processed and accessed. This is especially true in situations where the ZIP file container is large in size. Processing a ZIP file container and writing its contents in their original form to disk requires significant disk space in addition to that consumed by the ZIP file container itself. Thus, there is a need for improved techniques for the transmission of ZIP file containers.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for creating and transmitting streamable ZIP file containers (e.g., streamable archive files). Streamable ZIP file containers are configured to be received and processed simultaneously. Thus, a client can process a file in the streamable ZIP file container while it is being received from the network. This results in a reduction in processing time and disk space requirements when compared to traditional ZIP file containers.

Structurally, the streamable ZIP file container contains stream metadata, followed by files of the ZIP file container, followed by a central directory. Each of these can be complete files. The stream metadata can contain the version number of the ZIP file container metadata, the compression block size, the number of records (or files) in the ZIP file container, the standard file system permissions to be used for files and directories, and a list of files needing non-default file system permissions and the values of those permissions. The portions of the ZIP file container are in a contiguous stream without any intervening bytes. This results in a ZIP file container having files sequenced in the order they are to be processed (e.g., decompressed, decrypted, etc.) and without any undefined data. The central directory can describe the arrangement of files with the use of a number of ordered records.

As a streamable ZIP file container is being received by a client, an interruption may occur. In these situations, the transmission of the streamable ZIP file container can be recovered and resumed. In some examples, the sender or the receiver can maintain a resumption point set to one of a plurality of checkpoints in the streamable ZIP file container to identify the progress of the transmission. When an interrupt occurs, the resumption point can be used by the sender to recover from the interrupt and resume transmission of the streamable ZIP file container. Thus, the streamable ZIP file container is both streamable (e.g., can be processed while it is being received) and recoverable (e.g., can resume from an interruption).

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for systems, devices, techniques, and methods for streaming ZIP file containers (e.g., archive files). A streamable ZIP file container can offer many advantages over traditional ZIP file containers. For example, a streamable ZIP file container can be smaller in size than a traditional non-streamable ZIP file container. Moreover, streamable ZIP file containers can include additional metadata that allows received files from the streamable ZIP file container to begin decryption or decompression before the entire streamable ZIP file container is received. Lastly, a streamable zip file can also be directly extracted to disk, which requires less disk space to process the contents and producing less wear on storage hardware.

Figure 1:
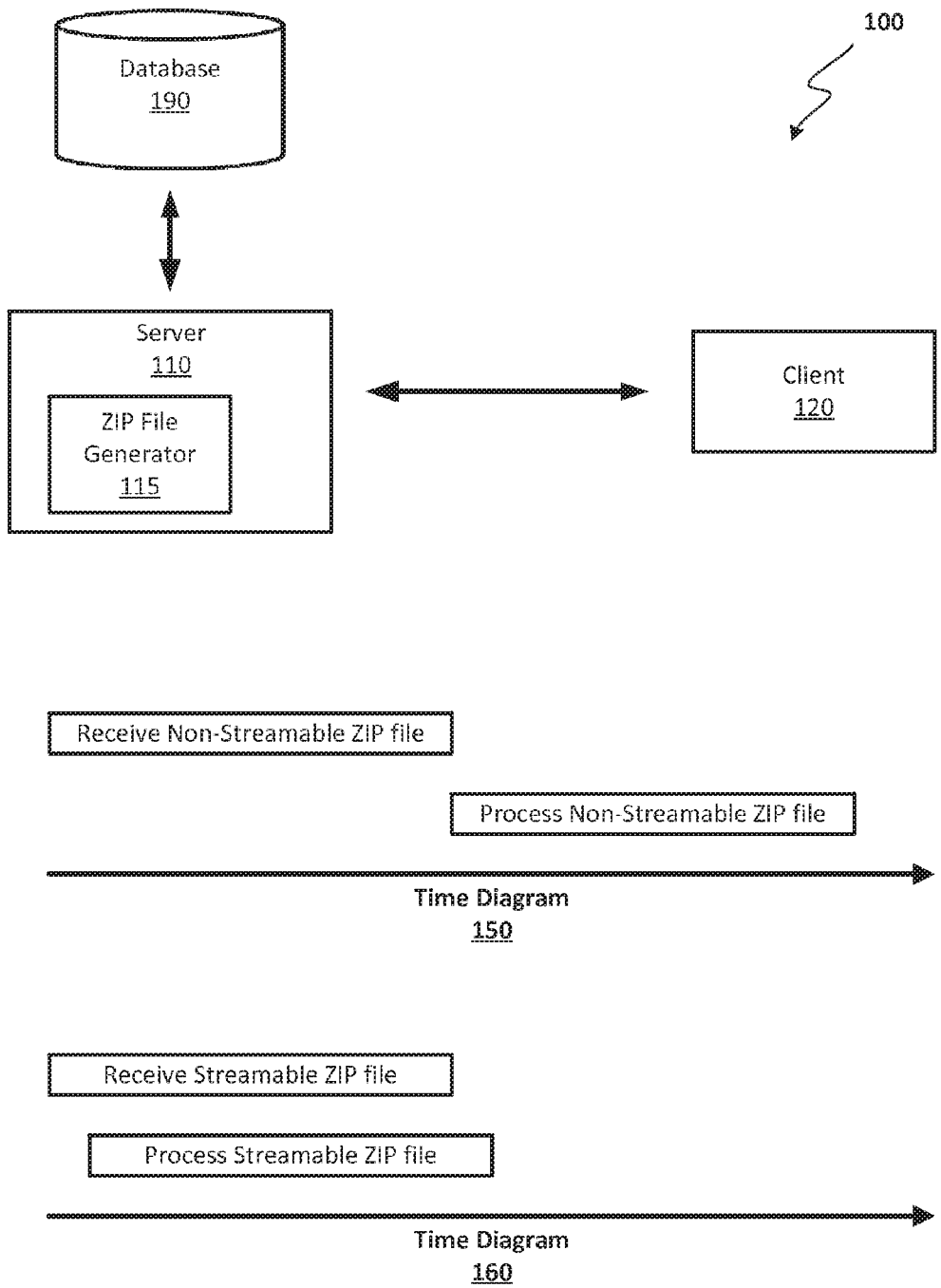
FIG. 1 illustrates an exemplary system configured to transfer ZIP file containers.

FIG. 1 illustrates an exemplary system configured to transfer ZIP file containers. System 100 includes server 110, client 120, and database 190. Client 120 can transmit a content request to server 110. In response to the content request, server 110 communicates with database 190 to retrieve the requested content. The requested content can be an application, a digital media item, a presentation, a document, or other types of digital content. In one embodiment, the content can be received in a ZIP container format. In other embodiments, the content can be received as several files or as a non-streamable ZIP file container format. In embodiments where the content is received as several files, ZIP file generator 115 of server 110 can package the content into a streamable ZIP file container. Once packaged, the streamable ZIP file container can be transmitted to client 120. This can involve optionally compressing or encrypting the content during packaging to create a condensed and/or encrypted streamable ZIP file container. In embodiments where the content is received as a non-streamable ZIP file container, ZIP file generator 115 can generate a streamable ZIP file container from the non-streamable version. The differentiation between a streamable and a non-streamable ZIP file container is described below in timing diagrams 150 and 160. In other examples, server 110 can be replaced with another client device, thus converting system 100 into a system to share content between multiple client devices.

Timing diagram 150 illustrates the amount of lag (represented as a period of time) after client 120 starts receiving a non-streamable ZIP file container before client 120 can access the contents of the non-streamable ZIP file container. As shown in timing diagram 150, client 120 receives the ZIP file container in its entirety before client 120 begins processing the non-streamable ZIP file container. Once processing is complete, client 120 can access the contents of the ZIP file container. In contrast, timing diagram 160 illustrates the amount of lag after client 120 starts receiving a streamable ZIP file container before client 120 can access the contents of the streamable ZIP file container. As shown, client 120 can begin processing the streamable ZIP file container shortly after receiving the streamable ZIP file container. For example, decompression of the ZIP file container can begin after receiving header information that identifies the ZIP file container as being streamable. This allows the receiving time and the processing time of the ZIP file container to overlap. As a result of the overlap, processing is completed shortly after receiving the entirety of the streamable ZIP file container which means that client 120 can access the contents of the container shortly after the streamable ZIP file container is received. In essence, a client device can access the contents of a streamable ZIP file container relatively sooner than a non-streamable ZIP file container at the expense of higher processor usage for a period of time where the receiving and processing overlap.

Timing diagrams 150 and 160 also illustrate that less disk space is needed when a client processes a streamable ZIP file. As shown in timing diagram 150, a non-streamable ZIP file is received in its entirety before processing begins. As a result, disk space is needed to store both the non-streamable ZIP file and the processed contents of the non-streamable ZIP file. In contrast, a streamable ZIP file can be received and processed at the same time as shown in timing diagram 160. Since files of the streamable ZIP file can be decompressed and extracted as the ZIP file is being received, less storage capacity is needed to store both the streamable ZIP file and the decompressed/extracted contents. As a result, less disk space is needed to process a streamable ZIP file.

Figure 2:
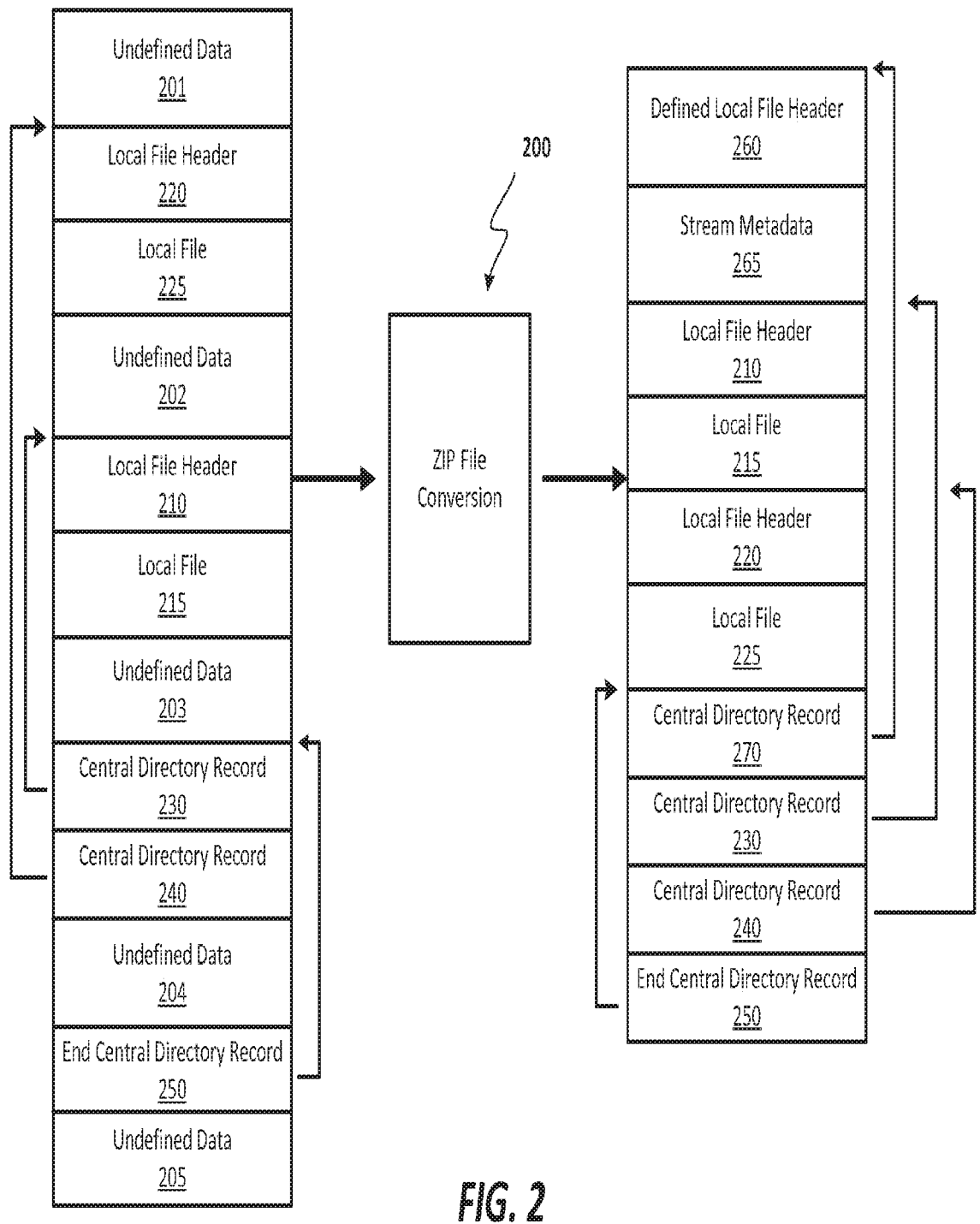
FIG. 2 illustrates an exemplary ZIP file conversion.

FIG. 2 illustrates an exemplary ZIP file conversion block. ZIP file conversion block 200 is configured to receive a non-streamable ZIP file container and convert the received container into a streamable ZIP file container. This can involve receiving, unpackaging, and repackaging the file container. In some examples, ZIP file conversion block 200 can be a part of ZIP file generator 115 of FIG. 1. As shown in FIG. 2, the received container (e.g., non-streamable version) includes local file header 220, local file 225, local file header 210, local file 215, central directory records 230 and 240, end central directory record 250. The central directory, which is made up of central directory record 230, central directory record 240, and end central directory record 250, includes offsets or pointers to different parts of the file container. For example, central directory record 230 includes a link to local file header 210, central directory record 240 includes a link to local file header 220, and end central file directory record 250 includes a link to central directory record 230. The central directory describes the processing order of the files in the ZIP file container. The received container also includes undefined data 201-204 that are dispersed through the container in between the files, thus creating a non-contiguous file container.

After a non-streamable ZIP file container is received, ZIP file conversion block 200 can unpackage the container. Unpackaging the container refers to the process of interpreting the contents of the container. When a non-streamable ZIP file container is unpackaged, end central directory record 250 is first located within the received container. In one example, ZIP file conversion 200 can iterate through the end of the received container until the end central directory record 250 is identified. The central directory record 250 includes a pointer (or offset) to the first central directory record (e.g., central directory record 230), which in turn can be used to locate the first file (e.g., local file header 210 and local file 215) for processing. After the first file is processed, iteration of the central directory continues to the second central directory record (e.g., central directory record 240) which is used to locate the second file (e.g., local file header 220 and local file 225). After the second local file is processed, the central directory continues to iterate to the next central directory record, if any. Once all the central directories are processed, iteration of the central directory reaches end central directory record 250, thus signifying that all the files have been ordered and processed. Processing can include decompression, decryption, or other data manipulation techniques. Processing can also include collecting metadata from the central directory and/or the local files.

Once the container has been unpackaged, ZIP file conversion block 200 can repackage the container into a streamable ZIP file container. ZIP file conversion block 200 can begin by creating and writing out defined local header 260 in a new container. The defined local header 260 can include header information for stream metadata 265. The defined local header 260 can also include a directory named "META-INF." In one example, the defined local header 260 can include a plurality of files that, in combination, identify the container as a streamable ZIP file container. For instance, an optional first file called "mimetype" can be present for file containers that contain an electronic publication. A directory named "META-INF" can then appear in the defined local header 260. The combination of the optional "mimetype" file and the "META-INF" directory can identify the container as being streamable. Alternatively, the defined local header 260 can also include a flag or other identifier configured to identify the container as a streamable ZIP file container. The flag can be read by client devices as an early indicator of whether the file container is streamable. After defined local header 260, ZIP file conversion block 200 can write out stream metadata 265. Stream metadata 265 can include metadata describing attributes and properties of the streamable ZIP file container. Since the file container is configured to be streamed and processed simultaneously, attributes and properties of the file container are provided to the client device in stream metadata 265 so that the client can determine the best way to process the file container as it is being read. Stream metadata 265 can include the version number of the ZIP file container, a default compression algorithm, the compression block size used to compress the local files, the number of files and/or records in the ZIP file container, a check sum associated with the ZIP file container to ensure that the files within the ZIP file container have not been altered, and a list of local files using a different compression algorithm than the default compression algorithm.

After writing stream metadata 265, ZIP file conversion block 200 can proceed by writing out the local file header and data for the files. In one embodiment, the files can be written out according to the central directory of the received container. For example, the file associated with the first central directory record of the received container can be written out first followed by the file associated with the second central directory record of the received container. This can continue until all the files are written out in sequential order without any intervening undefined data. In other embodiments, the files can be written out in an order other than the order specified by the central directory of the received container. For example, the files can be reordered differently than that specified by the central directory to allow support of additional activities during stream extraction. For instance, the application binary and supporting files can be reordered earlier in the ZIP file container to allow the signature of the application executable and its resources to be verified as other portions of the ZIP file container are being received. In some examples, the files to be written out can be automatically reordered by the ZIP file conversion block 200 in an order that would optimize the processing time of the streamable ZIP file container. For example, the contents of the ZIP file container can be examined as they are unpackaged and an order of the contents can be specified according to the contents of the ZIP file container. A mapping table or algorithm can select an optimal order based on an inventory of the contents of the received ZIP file container. Each file includes a local file header and a local file. For example, writing out the first file includes writing out local file header 210 and local file 215. In some embodiments, the local file header can store information to verify the integrity of the local file. For example, the local file header 210 can include a checksum to verify the integrity of local file 215. ZIP file conversion 200 can also optionally compress or encrypt the files. This can allow the files within the generated ZIP file to use the same compression and encryption algorithms.

In some embodiments, ZIP file conversion block 200 can verify that the written local file header includes certain information related to the data. For example, the ZIP file conversion block 200 can verify that the local file header stores the compressed size, uncompressed size, and/or checksum of the data associated with the local file header. In one example, information necessary to stream the data is confirmed to exist in the local file header.

Once the files have been written out, ZIP file conversion block 200 proceeds to write out the central directory. Similar to the central directory of the received container, the generated central directory contains a record for each file within the file container. Each record includes a pointer or offset to the beginning of the file. For example, central directory 270 includes an offset to the beginning of defined local file header 260, central directory 230 includes a pointer to the beginning of local file header 210, and central directory 240 includes a pointer to the beginning of local file header 220. The ordering of the records can be according to the order that the files within the container are to be processed by the client. Some of the central directory records can be copied from the received container, while others are newly generated. For instance, central directory 270 is newly created and points to the defined local file header 260, a file that was not in the received container. Once the central directory has been written out, followed by the End Central Directory Record, the streamable ZIP file container is complete. As shown, properties of the streamable ZIP file container are that the file is a contiguous stream of data without any intervening undefined data. In other words, each file in the ZIP file container shares a common boundary with another file. Moreover, the files in the streamable ZIP file container are sequenced according to the order the files are to be processed by the client. This allows the ZIP file container to be processed as it is received.

In other embodiments, ZIP file conversion block 200 can optionally leave the files packaged during creation of the streamable ZIP file container, thus avoiding spending resources in unpackaging the streamable ZIP file container. This however can result in a container with files having different compression or encryption schemes. In one embodiment, ZIP file conversion block 200 can process the central directory of the received container to determine its properties and attributes. For example, the version number of the ZIP file container, the default compression scheme or encryption scheme, the default compression block size applied to the files in the container, the number of files in the container, the checksum, and the compression block size or encryption scheme for files within the container that are not utilizing the default compression block size or encryption scheme can be determined by processing the central directory. These properties and attributes can be used when writing defined local file header 260, stream metadata 265, or the local file headers. In some examples, the properties and attributes can be found in two locations of the streamable ZIP file container: in stream metadata 265 at the beginning of the container and in the central directory at the end of the container. By providing the information in two locations, the streamable ZIP file container is backwards compatible for client devices that are unable to stream ZIP file containers. Moreover, devices capable of streaming ZIP file containers can skip transferring the central directory of the streamable ZIP file container since data stored in the central directory can be found from other locations of the streamable ZIP file container. This can result in an optimization in the amount of data transferred to the devices capable of streaming ZIP file containers. In one example, the properties and attributes are repeated in both locations.

Once the defined local file header 260 and stream metadata 265 are created, ZIP file conversion block 200 can iterate through the files of the received container according to the order specified in the central directory and write the files into the streamable ZIP file container. ZIP file conversion block 200 can also add in additional information into the local file header that was not in the local file header of the received file container. For example, information in a central directory record associated that relates to a local file can be copied into the local file header, thus allowing a client to gain access to all attributes and properties of the associated local file without having to read the associated central directory record.

After writing the files, ZIP file conversion block 200 can write out the central directory. The central directory can be substantially similar to the central directory of the received file container except for new central directory record 270 that contains the offset to defined local file header 260 and also an updated end central directory record 250 that accounts for central directory record 270. In other examples, different combinations utilizing the techniques described in the two different methods for generating the streamable ZIP file container above can be used to generate a streamable ZIP file container.

Figure 3:
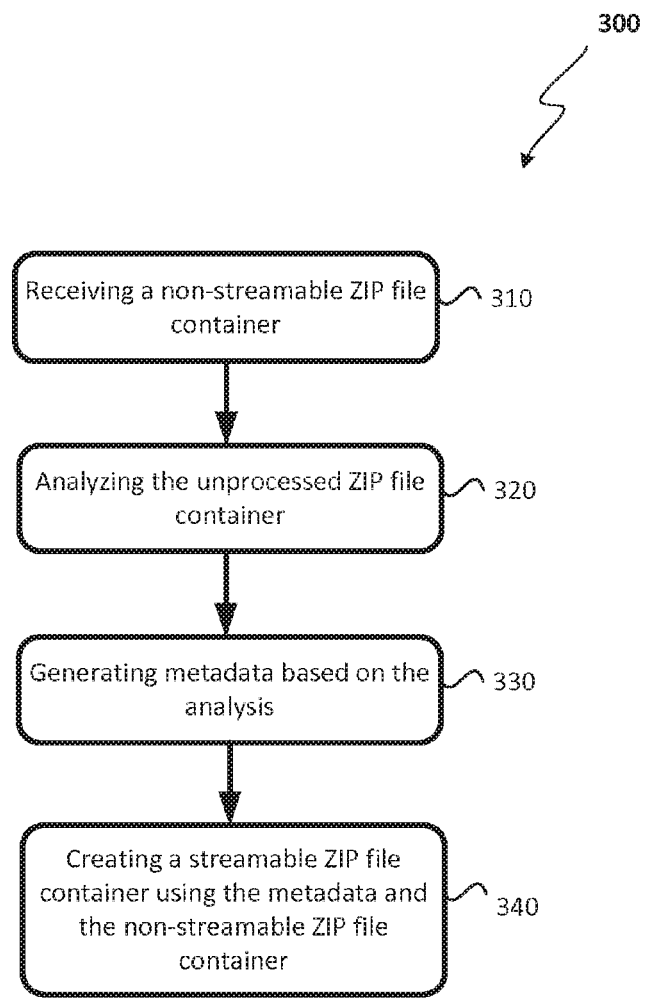
FIG. 3 illustrates an exemplary process for creating a streamable ZIP file container.

FIG. 3 illustrates an exemplary process for creating a streamable ZIP file container. Process 300 begins by receiving a non-streamable ZIP file container at 310. The non-streamable ZIP file container can be similar or substantially similar to the received container in FIG. 2. Once the non-streamable ZIP file container is received, the container can be analyzed at step 320. Analysis can include collecting attributes and properties of the local files and the container. Once the analysis has been completed on the file container, metadata describing the properties and attributes of the file container can be generated at 330. For example, defined local file header 260 and stream metadata 265 of FIG. 2 can be generated based on the analysis. After the metadata has been generated, a streamable ZIP file container can be created using the metadata and the non-streamable ZIP file container at step 340. This can include writing the defined local file header, stream metadata, files in the ZIP file container, and the central directory.

Figure 4:
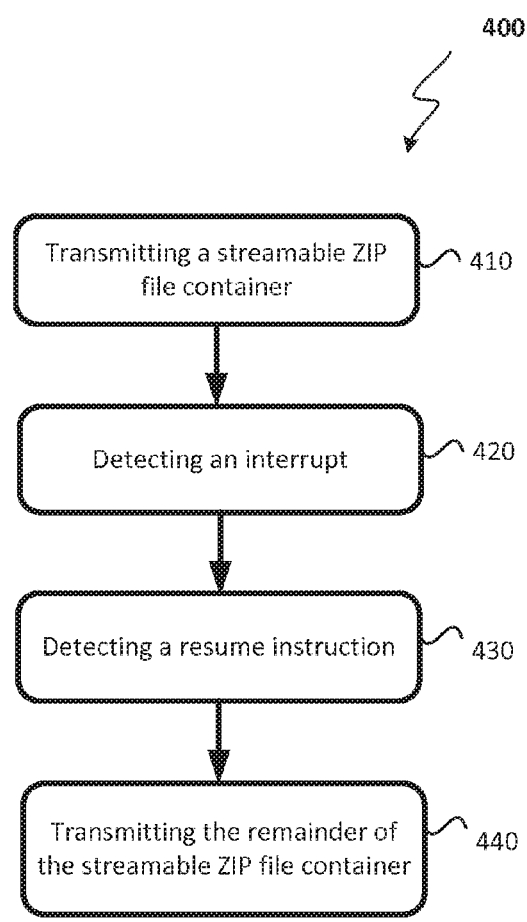
FIG. 4 illustrates an exemplary process for resuming transmission after detecting an interrupt.

In some embodiments, the server and client of FIG. 1 can be further configured to resume transmission of a streamable ZIP file container when an interrupt is detected. In other words, transmission of the streamable ZIP file container can be resumed after the interrupt without having to re-transmit the entire streamable ZIP file container. For example if an interrupt is detected while local file header 220 of the streamable ZIP file container of FIG. 2 is being received, the server can resume transmission of the streamable ZIP file container beginning with local file header 220. FIG. 4 illustrates an exemplary process for resuming transmission after detecting an interrupt. The exemplary process can be executed on a server configured to deliver ZIP file containers to client devices. Process 400 begins by transmitting a streamable ZIP file container to a client at 410. During the transmission, an interrupt is detected at 420. The interrupt can be detected by the server or alternatively can be provided by the client. The interrupt can be a network error, a server error, or a client error that results in an interruption in the transmission of the ZIP file container. After detecting the interrupt, a resume instruction is detected at 430. The resume instruction can be provided by the server or by the client to notify the server that the interruption has been cleared. For example, the server can provide a resume instruction after the server reboots or is back online or the client can provide a resume instruction after the client has rebooted or is back online. After receiving the resume instruction, the remainder of the streamable ZIP file container can be transmitted to the client.

In some examples, the server or the client can manage a resumption point that is used to identify the progress of the transmission of the streamable ZIP file container. When an interrupt occurs, the streamable ZIP file container can resume transmission based on the resumption point. In one example, the resumption point can be set to one of a plurality of predefined checkpoints in the streamable ZIP file container. Depending on implementation details, the predefined checkpoints can be located at the boundaries of the files which make up the streamable ZIP file container. The predefined checkpoints can also be more generic or specific. For example, the predefined checkpoints can specify a boundary of a section (defined local file header section, file section, central directory section) of the file container or can specify a chunk of a file belonging to the file container. The predefined checkpoint can also be an offset into the ZIP file container. In one example, the resumption point can be set when the interrupt is detected. For instance, the resumption point can be set to the file after the last file that was successfully transmitted by the server. In another example, the resumption point can be provided in the resume instruction. For instance, the client can provide a resumption point set to the file after the last file that was successfully received by the client. In some examples, the resumption point/checkpoint can be simply an offset into the ZIP file container. In other examples, the resumption point/checkpoint can depend on the applied encryption/compression algorithm. For instance, the resumption point/checkpoints can be the compression block boundaries.

Figure 5:
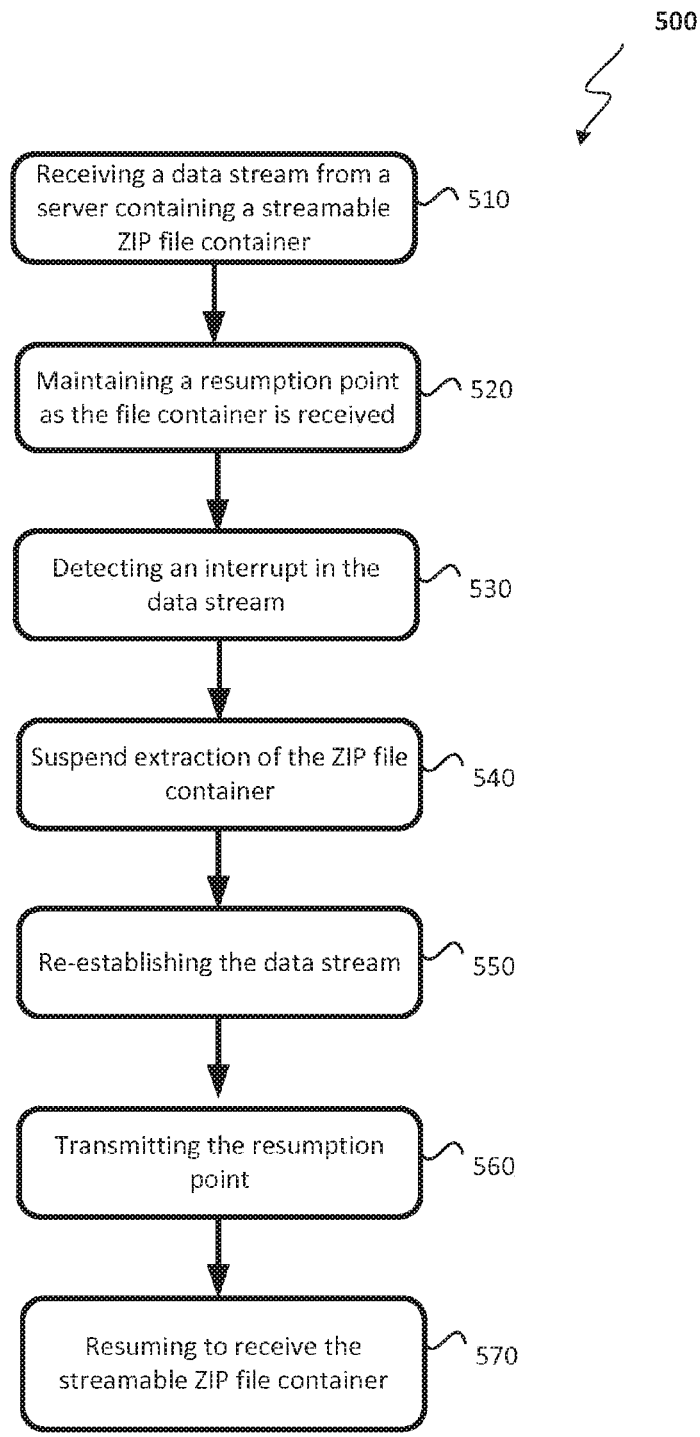
FIG. 5 illustrates another exemplary process for resuming transmission after detecting an interrupt.

FIG. 5 illustrates another exemplary process for resuming transmission after detecting an interrupt. The exemplary process can be executed by a client configured to receive ZIP file containers from a server. Process 500 can begin by receiving a data stream containing a streamable ZIP file container at 510. The data stream can be from a server or another client. A resumption point can be maintained as the file container is received at 520. As files are received the resumption point can be advanced until the entire file is received by the client. In one embodiment, the resumption point is advanced after a file is verified. Verification can include verifying that the file has not been corrupted, edited, or otherwise altered from when it was transmitted from the server. This can include verifying a checksum on the file, decompressing the file, decrypting the file, or other data processing techniques. In some examples, the resumption point can be maintained by a stream extractor that is configured to increment the resumption point as files are processed.

An interrupt can be detected in the data stream at 530. The interrupt can due to a poor/broken network connection or a device going offline. When the interrupt is detected, extraction of the ZIP file container can be suspended at 540. At some future point in time, the data stream is re-established at 550. Once the data stream is re-established, the resumption point is transmitted at 560. The resumption point can be transmitted to the transmitter (the server or another client) to notify the transmitter to resume transmission of the data stream starting at the resumption point. At 570, the client resumes receiving the streamable ZIP file container based on the resumption point.

Figure 6:
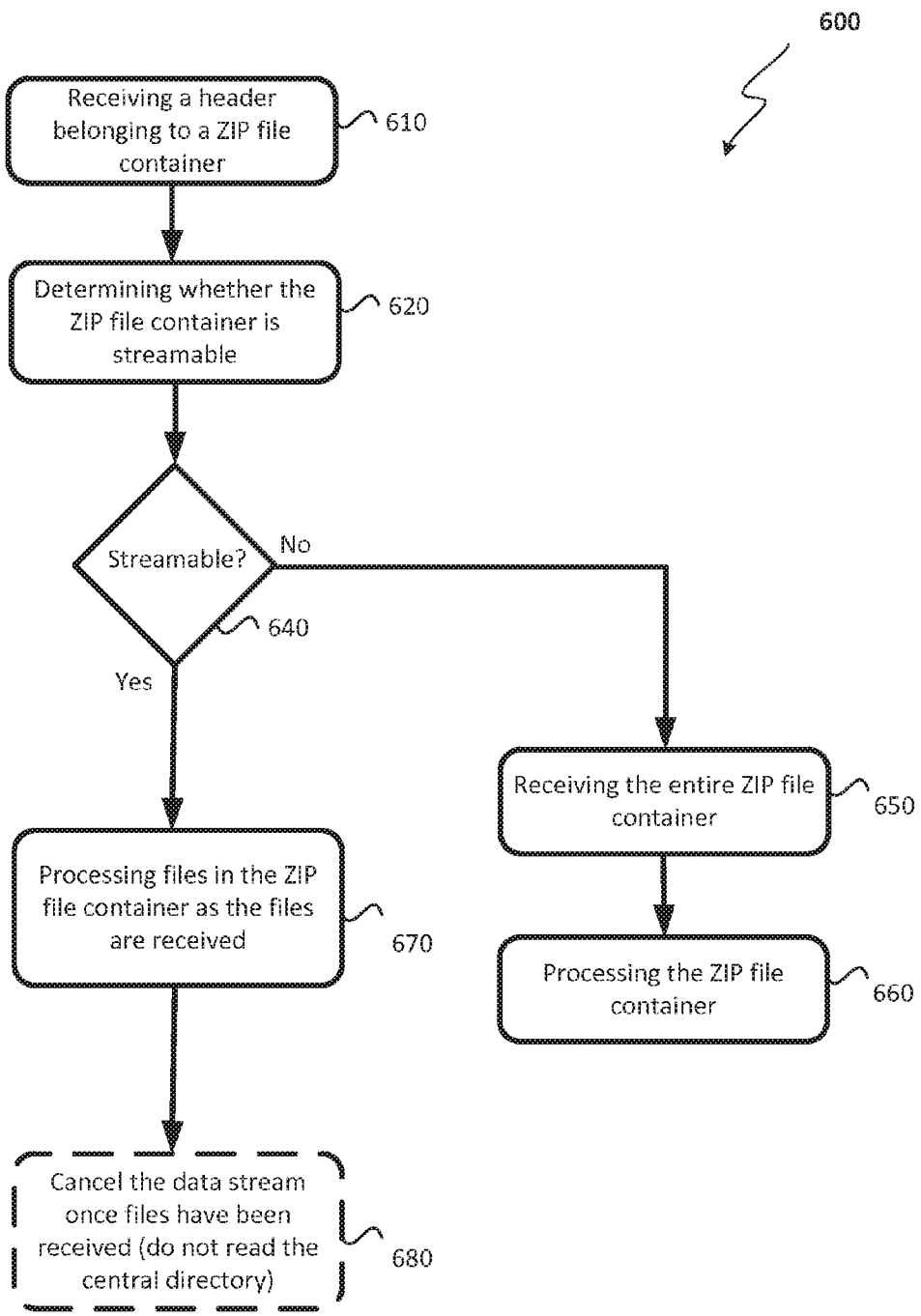
FIG. 6 illustrates an exemplary process for processing ZIP file containers.

FIG. 6 illustrates an exemplary process for processing ZIP file containers. The exemplary process can be executed by a client configured to receive and process both streamable and non-streamable ZIP file containers. Process 600 begins by receiving a header belonging to a ZIP file container at 610. In an example, the header can be defined local file header 260 of FIG. 2 or local file header 220 of FIG. 2. In other examples, a predetermined number of bytes of data or the first file from the file container can be received instead of a header. Process 600 can determine, based on the received information, whether the ZIP file container is streamable at 620. In one example, the identification of a flag or other property in the header can be used to determine the streamability of ZIP file container. In another example, a defined local file header can be identified based on properties or attributes in the header. For instance, the presence of a "mimetype" file and/or a "META-INF" directory can identify the file container as being streamable. In yet another example, both the header and the associated stream metadata file (local file) can be used to identify the file container as being streamable. For instance, an analysis of the properties of the defined local file header and the properties of the associated stream metadata file can identify the file as being streamable. The properties can include the name of the file/header, the format, or values stored within the file/header. If the ZIP file container is not streamable (at 640), process 600 continues to receive the entire ZIP file container at 650. Once the entire ZIP file container is received, process 600 can continue to process the ZIP file container at 660. Processing can include decrypting, decompressing, and verifying the contents of the ZIP file container. Alternatively if the ZIP container is streamable (at 640), process 600 continues to process the files in the ZIP file container as the files are received at 670. In other words, process 600 can process a local file header/local file pair as they are received. Processing can include decrypting, decompressing, and verifying the contents of the ZIP file container. As files are processing, they can be tracked to keep a count on the number of files that have been processed. Once all the files are processed (either by process 600 having processed the number of files specified in the container or by receiving a central directory record), process 600 can optionally cancel the data stream at 680. In other words, transmission of the central directory portion of the file container can be omitted when it is determined that the ZIP file container is streamable.

Figure 7:
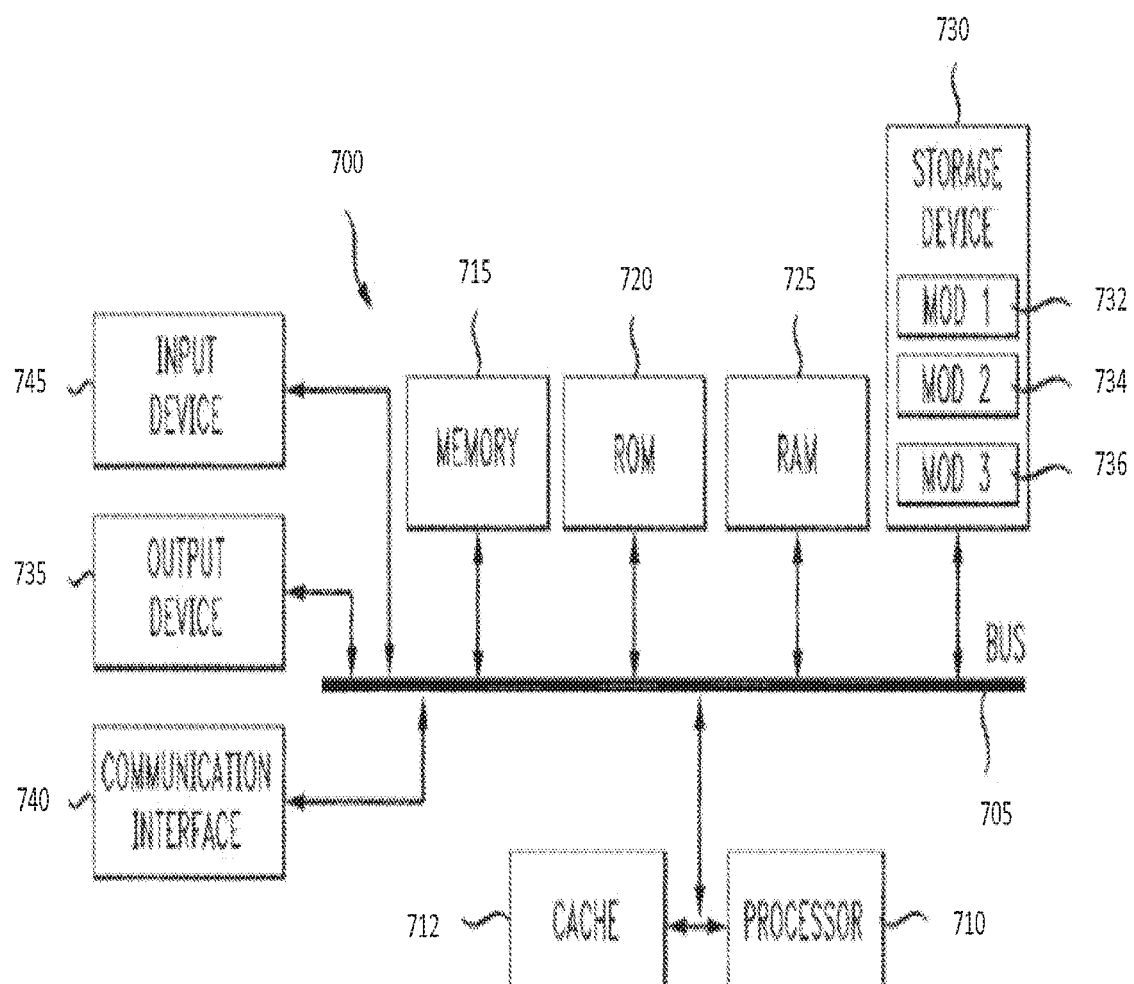
FIG. 7 illustrates a conventional system bus computing system architecture.
Figure 8:
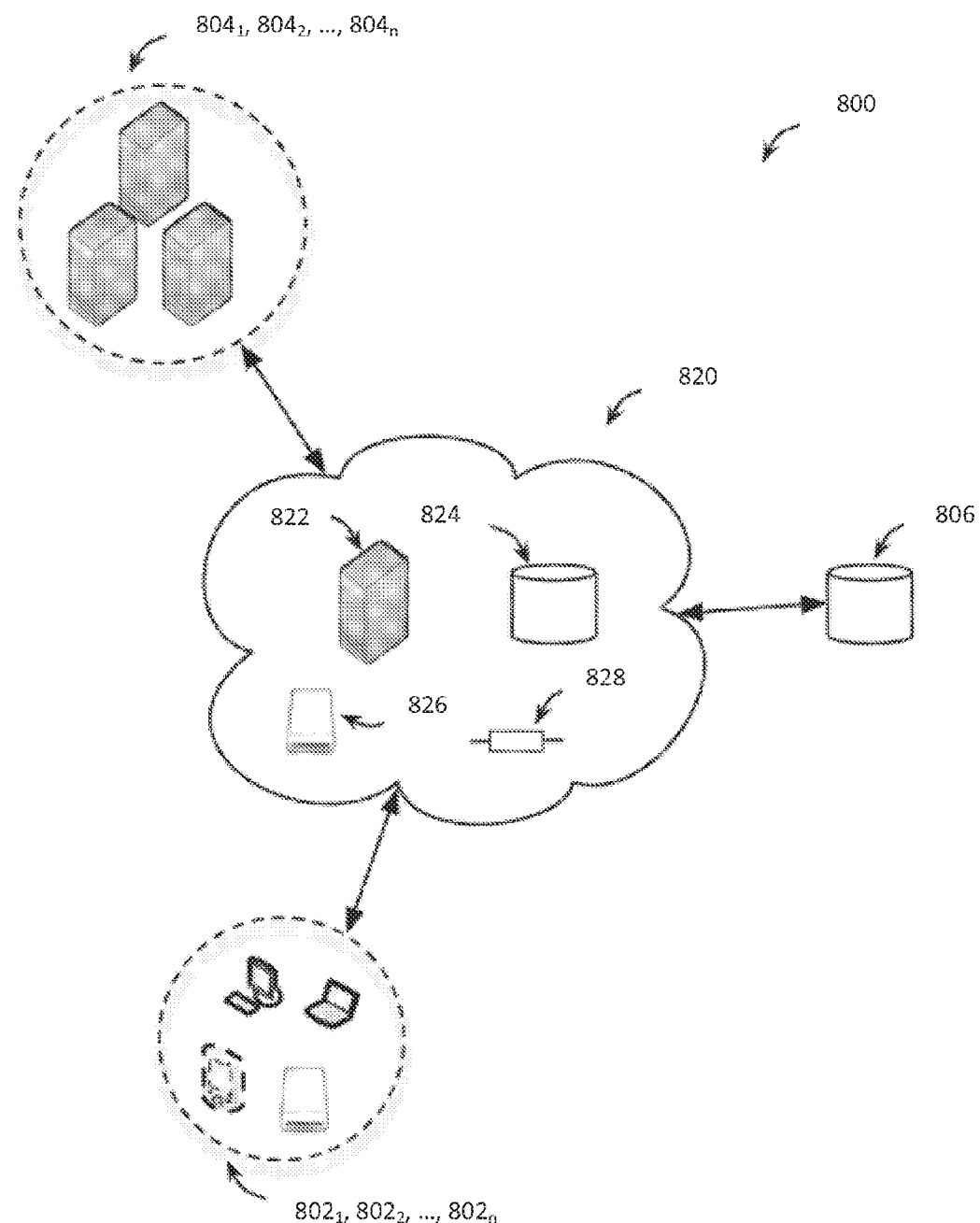
FIG. 8 illustrates an exemplary cloud computing system configuration.

FIG. 7 and FIG. 8 illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 7 illustrates a conventional system bus computing system architecture 700 wherein the components of the system are in electrical communication with each other using a bus 705. Exemplary system 700 includes a processing unit (CPU or processor) 710 and a system bus 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, display 735, and so forth, to carry out the function.

Cloud computing is a type of Internet-based computing in which a variety of resources are hosted and/or controlled by an entity and made available by the entity to authorized users via the Internet. FIG. 8 illustrates an exemplary cloud computing system configuration 800 wherein a variety of electronic devices can communicate via a network for purposes of exchanging content and other data. The system can be configured for use on a wide variety of network configurations that facilitate the intercommunication of electronic devices. For example, each of the components of system 800, in FIG. 8, can be implemented in a localized or distributed fashion in a network.

System 800 can be configured to include cloud computing resources 820 (i.e., "the cloud"). The cloud resources can include a variety of hardware and/or software resources, such as cloud servers 822, cloud databases 824, cloud storage 826, cloud networks 828, cloud applications, cloud platforms, and/or any other cloud-based resources. In some cases, the cloud resources are distributed. For example, cloud storage 826 can include multiple storage devices. In some cases, cloud resources can be distributed across multiple cloud computing systems and/or individual network enabled computing devices. For example, cloud computing resources 820 can communicate with servers $804_1$, $804_2$, . . . , $804_n$ (collectively "804"), database 806, and/or any other network enabled computing device to provide the cloud resources.

Furthermore, in some cases, the cloud resources can be redundant. For example, if cloud computing resources 820 is configured to provide data backup services, multiple copies of the data can be stored such that the data is still be available to the user even if a storage resource is offline, busy, or otherwise unavailable to process a request. In another example, if cloud computing resources 820 is configured to provide software, the software can be available from different cloud servers so that the software can be served from any of the different cloud servers. Algorithms can be applied such that the closest server or from the server with the lowest current load is selected to process a given request.

In system 800, a user interacts with cloud computing resources 820 through user terminals $802_1$, $802_2$, . . . , $802_n$ (collectively "802") connected to a network by direct and/or indirect communication. Cloud computing resources 820 can support connections from a variety of different electronic devices, such as servers; desktop computers; mobile computers; handheld communications devices, e.g., mobile phones, smart phones, tablets; set top boxes; network-enabled hard drives; and/or any other network-enabled computing devices. Furthermore, cloud computing resources 820 can concurrently accept connections from and interact with multiple electronic devices. Interaction with the multiple electronic devices can be prioritized or occur simultaneously.

Cloud computing resources 820 can provide cloud resources through a variety of deployment models, such as public, private, community, hybrid, and/or any other cloud deployment model. In some cases, cloud computing resources 820 can support multiple deployment models. For example, cloud computing resources 820 can provide one set of resources through a public deployment model and another set of resources through a private deployment model.

In some configurations, a user terminal 802 can access cloud computing resources 820 from any location where an Internet connection is available. However, in other cases, cloud computing resources 820 can be configured to restrict access to certain resources such that a resource can only be accessed from certain locations. For example, if cloud computing resources 820 is configured to provide a resource using a private deployment model, then cloud computing resources 820 can restrict access to the resource, such as by requiring that a user terminal 802 access the resource from behind a firewall.

Cloud computing resources 820 can provide cloud resources to user terminals 802 through a variety of service models, such as Software as a Service (SaaS), Platforms as a service (PaaS), Infrastructure as a Service (IaaS), and/or any other cloud service models. In some cases, cloud computing resources 820 can provide multiple service models to a user terminal 802. For example, cloud computing resources 820 can provide both SaaS and IaaS to a user terminal 802. In some cases, cloud computing resources 820 can provide different service models to different user terminals 802. For example, cloud computing resources 820 can provide SaaS to user terminal $802_1$ and PaaS to user terminal $802_2$.

In some cases, cloud computing resources 820 can maintain an account database. The account database can store profile information for registered users. The profile information can include resource access rights, such as software the user is permitted to use, maximum storage space, etc. The profile information can also include usage information, such as computing resources consumed, data storage location, security settings, personal configuration settings, etc. In some cases, the account database can reside on a database or server remote to cloud computing resources 820 such as servers 804 or database 806.

Cloud computing resources 820 can provide a variety of functionality that requires user interaction. Accordingly, a user interface (UI) can be provided for communicating with cloud computing resources 820 and/or performing tasks associated with the cloud resources. The UI can be accessed via an end user terminal 802 in communication with cloud computing resources 820. The UI can be configured to operate in a variety of client modes, including a fat client mode, a thin client mode, or a hybrid client mode, depending on the storage and processing capabilities of cloud computing resources 820 and/or the user terminal 802. Therefore, a UI can be implemented as a standalone application operating at the user terminal in some embodiments. In other embodiments, a web browser-based portal can be used to provide the UI. Any other configuration to access cloud computing resources 820 can also be used in the various embodiments.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for transmitting streamable archive containers to client computing devices, the method comprising, at a server computing device:
   transmitting a streamable archive container to a client computing device via a network connection, wherein the streamable archive container includes a plurality of files;
   receiving an indication that transmitting the streamable archive container is interrupted;
   establishing a resumption point based on the indication, wherein the resumption point corresponds to a particular file of the plurality of files that was successfully transmitted to the client computing device; and
   in response to receiving an instruction to resume transmitting the streamable archive container:
      identifying, based on the resumption point, remaining files of the plurality of files to transmit to the client computing device, and
      transmitting the remaining files to the client computing device.

2. The method of claim 1, wherein each file of the plurality of files is associated with a respective predefined checkpoint.

3. The method of claim 2, wherein the resumption point is assigned to the respective predefined checkpoint associated with the particular file.

4. The method of claim 1, wherein transmitting the streamable archive container is interrupted when a network error, a server computing device error, or a client computing device error occurs.

5. The method of claim 1, wherein the instruction is generated by the client computing device or the server computing device.

6. The method of claim 1, wherein, prior to transmitting the streamable archive container to the client computing device, the method further comprises:
   converting a non-streamable archive container into the streamable archive container.

7. The method of claim 1, wherein each file of the plurality of files is successfully transmitted to the client computing device when the client computing device receives and verifies the file.

8. The method of claim 1, wherein the plurality of files of the streamable archive container are sequenced according to an order in which the files are to be processed by the client computing device.

9. A non-transitory computer readable medium storing instructions that, when executed by at least one processor included in a server computing device, cause the server computing device to transmit streamable archive containers to computing devices, by carrying out steps that include:
   transmitting a streamable archive container to a client computing device via a network connection, wherein the streamable archive container includes a plurality of files;
   receiving an indication that transmitting the streamable archive container is interrupted;
   establishing a resumption point based on the indication, wherein the resumption point corresponds to a particular file of the plurality of files that was successfully transmitted to the client computing device; and
   in response to receiving an instruction to resume transmitting the streamable archive container:
      identifying, based on the resumption point, remaining files of the plurality of files to transmit to the client computing device, and
      transmitting the remaining files to the client computing device.

10. The non-transitory computer readable medium of claim 9, wherein each file of the plurality of files is associated with a respective predefined checkpoint.

11. The non-transitory computer readable medium of claim 10, wherein the resumption point is assigned to the respective predefined checkpoint associated with the particular file.

12. The non-transitory computer readable medium of claim 9, wherein transmitting the streamable archive container is interrupted when a network error, a server computing device error, or a client computing device error occurs.

13. The non-transitory computer readable medium of claim 9, wherein the instruction is generated by the client computing device or the server computing device.

14. The non-transitory computer readable medium of claim 9, wherein, prior to transmitting the streamable archive container to the client computing device, the steps further include:
   converting a non-streamable archive container into the streamable archive container.

15. A server computing device configured to transmit streamable archive containers to computing devices, the server computing device comprising:
   at least one processor; and
   at least one memory storing computer executable instructions that, when executed by the at least one processor, cause the server computing device to:

transmit a streamable archive container to a client computing device via a network connection, wherein the streamable archive container includes a plurality of files;
receive an indication that transmitting the streamable archive container is interrupted;
establish a resumption point based on the indication, wherein the resumption point corresponds to a particular file of the plurality of files that was successfully transmitted to the client computing device; and
in response to receiving an instruction to resume transmitting the streamable archive container:
identify, based on the resumption point, remaining files of the plurality of files to transmit to the client computing device, and transmitting the remaining files to the client computing device.

16. The server computing device of claim 15, wherein each file of the plurality of files is associated with a respective predefined checkpoint.

17. The server computing device of claim 16, wherein the resumption point is assigned to the respective predefined checkpoint associated with the particular file.

18. The server computing device of claim 15, wherein transmitting the streamable archive container is interrupted when a network error, a server computing device error, or a client computing device error occurs.

19. The server computing device of claim 15, wherein the instruction is generated by the client computing device or the server computing device.

20. The server computing device of claim 15, wherein, prior to transmitting the streamable archive container to the client computing device, the at least one processor further causes the server computing device to:
convert a non-streamable archive container into the streamable archive container.

* * * * *